United States Patent
Noh

(10) Patent No.: US 7,510,807 B2
(45) Date of Patent: *Mar. 31, 2009

(54) NON-AQUEOUS ELECTROLYTE AND A LITHIUM SECONDARY BATTERY COMPRISING THE SAME

(75) Inventor: Hyung-Gon Noh, Suwon (KR)

(73) Assignee: Samsung SDI Co., Ltd., Suwon-si (KR)

( * ) Notice: Subject to any disclaimer, the term of this patent is extended or adjusted under 35 U.S.C. 154(b) by 691 days.

This patent is subject to a terminal disclaimer.

(21) Appl. No.: 10/834,668

(22) Filed: Apr. 28, 2004

(65) Prior Publication Data

US 2004/0229128 A1    Nov. 18, 2004

(30) Foreign Application Priority Data

May 13, 2003    (KR) .............. 10-2003-0030380

(51) Int. Cl.
*H01M 6/16* (2006.01)

(52) U.S. Cl. .............. 429/328; 429/330; 429/326; 429/327; 429/307; 429/331; 429/332; 429/338; 429/199; 429/200

(58) Field of Classification Search .............. 429/307, 429/326, 330, 332, 331, 338, 340, 199, 200, 429/341, 328, 327

See application file for complete search history.

(56) References Cited

U.S. PATENT DOCUMENTS

| | | | |
|---|---|---|---|
| 5,626,981 | A | 5/1997 | Simon et al. |
| 6,833,219 | B2 | 12/2004 | Lee et al. |
| 6,921,612 | B2 * | 7/2005 | Choy et al. .............. 429/326 |
| 7,223,500 | B2 * | 5/2007 | Noh et al. .............. 429/307 |
| 2002/0045102 | A1 * | 4/2002 | Jung et al. .............. 429/330 |
| 2003/0008213 | A1 * | 1/2003 | Cho .............. 429/231.95 |
| 2004/0146786 | A1 * | 7/2004 | Sato et al. .............. 429/326 |

FOREIGN PATENT DOCUMENTS

| | | |
|---|---|---|
| JP | 06-333596 | 12/1994 |
| JP | 08-064238 | 3/1996 |
| JP | 08-321312 | 12/1996 |
| JP | 09/073918 | 3/1997 |
| JP | 10-154529 | * 6/1998 |
| JP | 11-067265 | 3/1999 |

(Continued)

OTHER PUBLICATIONS

Patent Abstract of Japan 2002-015769, Published Jan. 18, 2002, in the name of Minoru.

(Continued)

*Primary Examiner*—Laura S Weiner
(74) *Attorney, Agent, or Firm*—Christie, Parker & Hale, LLP

(57) ABSTRACT

Disclosed is an electrolyte of a lithium secondary battery comprising a lithium salt, an organic solvent, and at least one additive compound selected from the group consisting of compounds represented by the following formula (1) and derivatives thereof:

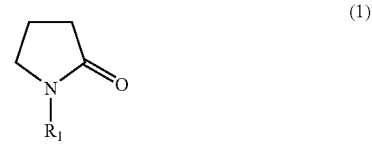

(1)

where $R_1$ is selected from the group consisting of hydrogen radicals, alkyls aryls, cycloalkyls, alkenyls, alkynyls, ester radicals, and aliphatic carbonate radicals. The electrolyte improves both swelling inhibition properties at high temperature and capacity characteristics of a lithium secondary battery.

13 Claims, 4 Drawing Sheets

FOREIGN PATENT DOCUMENTS

| | | |
|---|---|---|
| JP | 2002-15769 | 1/2002 |
| JP | 2003-297424 | 10/2003 |
| JP | 2004-342585 | 12/2004 |
| KR | 2000-0061613 | 10/2000 |
| WO | WO 02/093679 | 11/2002 |

OTHER PUBLICATIONS

Megahed, et al., "Lithium-ion rechargeable batteries" Journal of Power Sources, 51 (1994) 79-104.

Yang, et al., Composition analysis of the passive film on the carbon electrode of a lithium-ion battery with an EC-based electrolyte Journal of Power Sources, 72 (1998) 66-70.

Patent Abstracts of Japan for Publication No. 06-333596, Publication Date Dec. 2, 1994.

Patent Abstracts of Japan for Publication No. 08-064238, Publication Date Mar. 8, 1996.

Patent Abstracts of Japan for Publication No. 08-321312, Publication Date Dec. 3, 1996.

Patent Abstracts of Japan for Publication No. 09-073918, Publication Date Mar. 18, 1997.

Korean Patent Abstracts for Publication No. 1020000061613; Date of publication application Oct. 25, 2000, in the name of G. Kim et al.

Patent Abstracts of Japan, Publication No. 10-154529, dated Jun. 9, 1998, in the name of Tanaka Mitsutoshi et al.

Patent Abstracts of Japan, Publication No. 11-067265, dated Mar. 9, 1999, in the name of Horiuchi Hiroshi et al.

Patent Abstracts of Japan, Publication No. 2003-297424, dated Oct. 17, 2003, in the name of Segawa Takeshi et al.

Patent Abstracts of Japan, Publication No. 2004-342585, dated Dec. 2, 2004, in the name of Ro Kyokon.

* cited by examiner

NON-AQUEOUS ELECTROLYTE AND A LITHIUM SECONDARY BATTERY COMPRISING THE SAME

CROSS REFERENCE TO RELATED APPLICATION

This application claims priority of Korean patent application No. 2003-30380 filed in the Korean Intellectual Property Office on May 13, 2003, the entire disclosure of which is incorporated herein by reference.

BACKGROUND OF THE INVENTION (a) Field of the Invention

The present invention relates to a non-aqueous electrolyte and a lithium secondary battery comprising the same, and more particularly, to a non-aqueous electrolyte for a lithium secondary battery that prevents a battery from swelling, while maintaining the electrochemical properties of the battery.

(b) Description of the Related Art

Due to recent trends toward more compact and lighter portable electronic equipment, there has been a growing need to develop a high performance and large capacity battery to power portable electronic equipment. In particular, there has been extensive research to provide lithium secondary batteries with good safety characteristics and improved electrochemical properties. Lithium secondary batteries use materials that reversibly intercalate or deintercalate lithium ions during charge and discharge reactions for both positive and negative active materials. The positive active materials include lithium metal oxide and the negative materials include lithium metals, lithium-containing alloys, or materials that are capable of reversible intercalation/deintercalation of lithium ions such as crystalline or amorphous carbons, or carbon-containing composites.

The average discharge voltage of a lithium secondary battery is about 3.6 to 3.7V, which is higher than other alkali batteries, Ni-MH batteries, Ni—Cd batteries, etc. However, an electrolyte that is electrochemically stable in the charge and discharge voltage range of 0 to 4.2V is required in order to generate such a high driving voltage. As a result, a mixture of non-aqueous carbonate-based solvents, such as ethylene carbonate, dimethyl carbonate, diethyl carbonate, etc., is used as an electrolyte. However, such an electrolyte has significantly lower ion conductivity than an aqueous electrolyte that is used in a Ni-MH battery or a Ni—Cd battery, thereby resulting in the deterioration of battery characteristics during charging and discharging at a high rate.

During the initial charge of a lithium secondary battery, lithium ions, which are released from the lithium-transition metal oxide positive electrode of the battery, are transferred to a carbon negative electrode where the ions are intercalated into the carbon. Because of its high reactivity, lithium reacts with the carbon negative electrode to produce $Li_2CO_3$, LiO, LiOH, etc., thereby forming a thin film on the surface of the negative electrode. This film is referred to as an organic solid electrolyte interface (SEI) film. The organic SEI film formed during the initial charge not only prevents the reaction between lithium ions and the carbon negative electrode or other materials during charging and discharging, but it also acts as an ion tunnel, allowing the passage of only lithium ions. The ion tunnel prevents disintegration of the structure of the carbon negative electrode, which is caused by co-intercalation of organic solvents having a high molecular weight along with solvated lithium ions into the carbon negative electrode.

Once the organic SEI film is formed, lithium ions do not react again with the carbon electrode or other materials, such that an amount of lithium ions is maintained. That is, carbon from the negative electrode reacts with the electrolyte during the initial charging, thus forming a passivation layer such as an organic SEI film on the surface of the negative electrode such that the electrolyte solution no longer decomposes, and stable charging and discharging are maintained (*J. Power Sources*, 51(1994), 79-104). As a result, in the lithium secondary battery, there is no irreversible formation reaction of the passivation layer, and a stable cycle life after the initial charging reaction is maintained.

However, gases are generated inside the battery due to decomposition of the carbonate-based organic solvent during the organic SEI film-forming reaction (*J. Power Sources*, 72(1998), 66-70). These gases include $H_2$, CO, $CO_2$, $CH_4$, $C_2H_6$, $C_3H_8$, $C_3H_6$, etc. depending on the type of non-aqueous organic solvent and negative active material used. The thickness of the battery increases during charging due to the generation of gas inside the battery, and the passivation layer slowly disintegrates by electrochemical energy and heat energy, which increase with the passage of time when the battery is stored at a high temperature after it is charged. Accordingly, a side reaction in which an exposed surface of the negative electrode reacts with the surrounding electrolyte occurs continuously. Furthermore, the internal pressure of the battery increases with this generation of gas. The increase in the internal pressure induces the deformation of prismatic and lithium polymer batteries. As a result, regional differences in the cohesion among electrodes inside the electrode assembly (positive and negative electrode, and separator) of the battery occur, thereby deteriorating the performance and safety of the battery and making it difficult to mount the lithium secondary battery set into electronic equipment.

For solving the internal pressure problem, there is disclosed a method in which the safety of a secondary battery including a non-aqueous electrolyte is improved by mounting a vent or a current breaker for ejecting internal electrolyte solution when the internal pressure is increased above a certain level. However, a problem with this method is that misoperation may result from an increase in internal pressure itself.

Furthermore, a method in which the SEI-forming reaction is changed by injecting additives into an electrolyte so as to inhibit the increase in internal pressure is known. For example, Japanese Laid-open Patent No. 97-73918 discloses a method in which high temperature storage characteristics of a battery are improved by adding 1% or less of a-diphenyl picrylhydrazyl compound to the electrolyte. Japanese Laid-open Patent No. 96-321312 discloses a method in which cycle life and long-term storage characteristics are improved using 1 to 20% of an N-butyl amine based compound in an electrolyte. Japanese Laid-open Patent No. 96-64238 discloses a method in which storage characteristics of a battery are improved by adding $3 \times 10^{-4}$ to $3 \times 10^{-2}$ M of calcium salt to the electrolyte. Japanese Laid-open Patent No. 94-333596 discloses a method in which the storage characteristics of a battery are improved by adding an azo-based compound to inhibit the reaction between an electrolyte and a negative electrode of the battery.

Such methods as described above for inducing the formation of an appropriate film on a negative electrode surface such as an organic SEI film by adding a small amount of organic or inorganic materials are used in order to improve the storage characteristics and safety of a battery. However, there are various problems with these methods. For example, the added compound decomposes or forms an unstable film by interacting with the carbon negative electrode during the initial charge and discharge due to inherent electrochemical characteristics, resulting in the deterioration of the ion mobility in electrons. Also, gas is generated inside the battery such that there is an increase in internal pressure, resulting in significant deterioration of the storage, safety, cycle life, and capacity characteristics of the battery.

SUMMARY OF THE INVENTION

In one embodiment of the present invention, a non-aqueous electrolyte for a lithium secondary battery is provided comprising additive compounds that inhibit the generation of gas inside the battery.

In another embodiment of the present invention, a lithium secondary battery is provided having good swelling inhibition properties and good cycle-life characteristics at high temperature.

In yet another embodiment of the present invention, an electrolyte for a lithium secondary battery is provided, the electrolyte comprising a lithium salt; a non-aqueous organic solvent; and an additive compound selected from the group consisting of compounds represented by formula (1) and derivatives thereof:

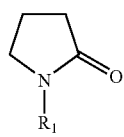

(1)

where $R_1$ is selected from the group consisting of hydrogen radicals, alkyls, aryls, cycloalkyls, alkenyls, alkynyls, ester radicals, and aliphatic carbonate radicals.

In still another embodiment of the present invention, a lithium secondary battery comprising the electrolyte is provided.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION

In the following detailed description, only the preferred embodiment of the invention has been shown and described, simply by way of illustration of the best mode contemplated by the inventors of carrying out the invention. As will be realized, the invention is capable of modification in various obvious respects, all without departing from the invention. Accordingly, the drawings and description are to be regarded as illustrative in nature, and not restrictive.

Figure 1:
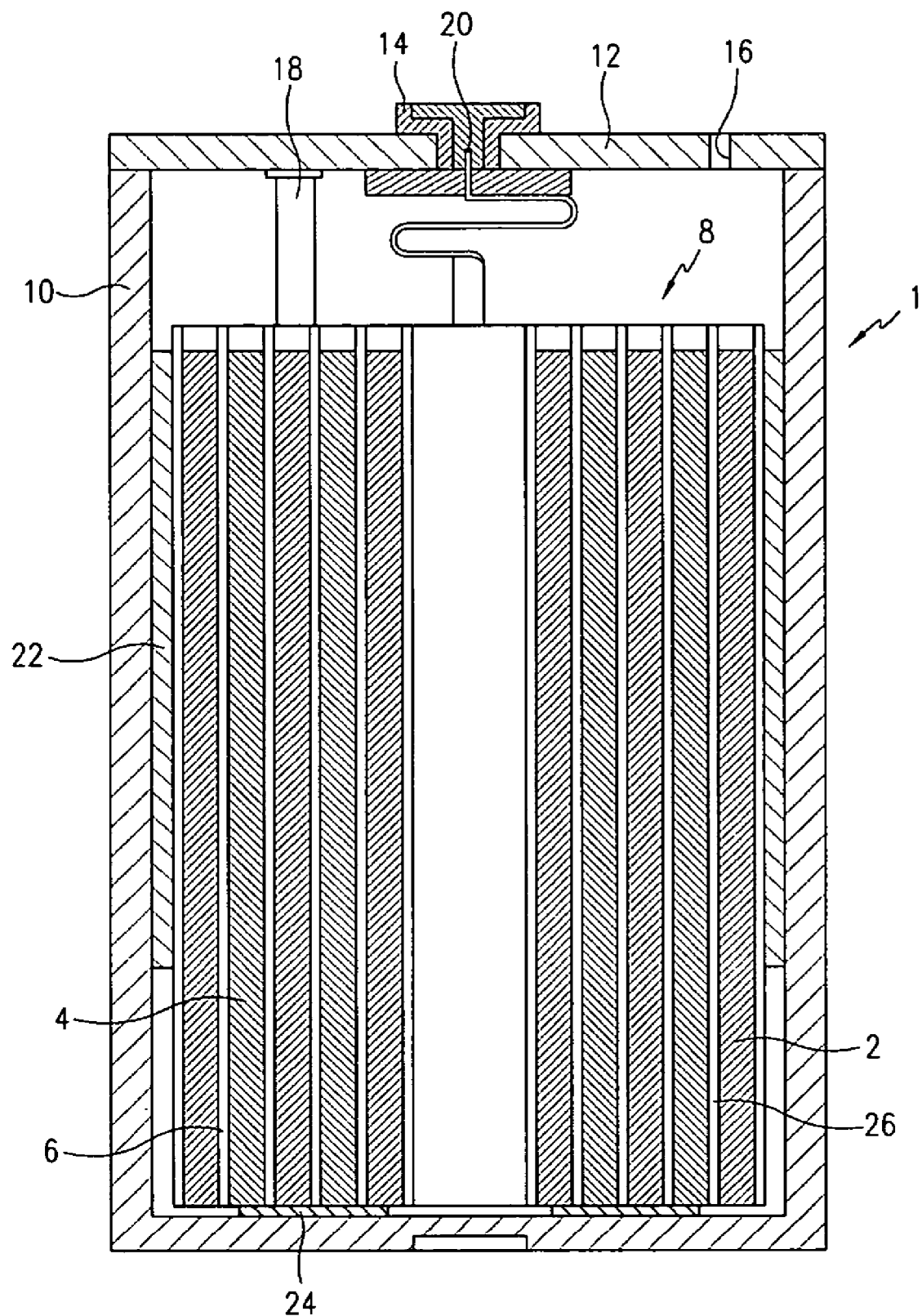
FIG. 1 is a sectional view of a prismatic lithium secondary battery.

A cross-sectional view of a general non-aqueous Li-ion cell is shown in FIG. 1. The Li-ion cell 1 is fabricated by inserting an electrode assembly 8 including a positive electrode 2, a negative electrode 4, and a separator 6 between the positive and negative electrodes, into a battery case 10. An electrolyte 26 is injected into the battery case 10 and impregnated into the separator 6. The upper part of the case 10 is sealed with a cap plate 12 and a sealing gasket 14. The cap plate 12 has a safety vent 16 to release pressure. A positive electrode tab 18 and a negative electrode tab 20 are respectively attached to the positive electrode 2 and negative electrode 4. Insulators 22 and 24 are installed on the lower part and the side part of the electrode assembly 8 to prevent a short circuit occurrence in the battery.

The electrolyte of the present invention includes an additive selected from the group consisting of compounds represented by formula (1) and derivatives thereof that improve both swelling inhibition and cycle life characteristics of the battery, even though a conventional material that is capable of reversible intercalation/deintercalation of lithium ions is used as a positive active material and conventional carbonaceous materials are used as a negative material.

Currently-used positive active materials include lithium-cobalt-based oxides, lithium-manganese-based oxides, lithium-nickel-based oxides, lithium-nickel-manganese-based oxides, etc. The lithium-nickel-based and lithium-nickel-manganese-based oxides are inexpensive and manifest a high discharge capacity, but tend to cause battery swelling from gas generation during high-temperature storage. However, the electrolyte of the present invention can solve the problem of deterioration of battery performance such as capacity and cycle life even when a lithium-nickel-based or lithium-nickel-manganese-based oxide is used as a positive active material.

Graphite as a currently-used negative active material has a good voltage flatness because it can maintain a certain potential during intercalation of lithium ions. However, it has a theoretical capacity of less than 372 mAh/g and a practical capacity of less than 300 mAh/g. Natural graphite has a larger discharge capacity than artificial graphite of mesocarbon microbeads (MCMB) or mesocarbon fiber (MCF), but it has a very large irreversible capacity and deteriorates the discharge characteristics of an electrode because it has a flat shape. However, the electrolyte of the present invention shows good discharge characteristics even when graphite, especially natural graphite, is used as a negative material.

The electrolyte of the present invention can inhibit swelling from gas generation inside the batteries during high temperature storage by the inclusion of an additive compound selected from the group consisting of the compound of formula (1) and derivatives thereof.

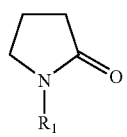

(1)

$R_1$ of formula (1) is selected from the group consisting of hydrogen radicals, alkyls, aryls, cycloalkyls, alkenyls, alkynyls, ester radicals, and aliphatic carbonate radicals. The alkyl is preferably a $C_1$ to $C_7$ alkyl, more preferably a $C_1$ to $C_4$ alkyl. The aryl is preferably a $C_6$ to $C_{12}$ aryl, more preferably a $C_6$ to $C_{10}$ aryl. The cycloalkyl is preferably a $C_3$ to $C_{11}$ cycloalkyl, more preferably a $C_3$ to $C_6$ cycloalkyl. The alkenyl is preferably a $C_2$ to $C_7$ alkenyl, more preferably a $C_2$ to $C_4$ alkenyl. The alkynyl is preferably a $C_2$ to $C_7$ alkynyl, more preferably a $C_2$ to $C_4$ alkynyl. The ester radical is preferably represented by —COOR' where R' is an alkyl, preferably a methyl or ethyl. The aliphatic carbonate radical is preferably represented by —CO(OR"), where R" is an alkyl, preferably a methyl or ethyl.

Examples of the additive compound include 1-methyl-2-pyrrolidone, 1-vinyl-2-pyrrolidone, 1-ethyl-2-pyrrolidone, 1-phenyl-2-pyrrolidone, etc.

The additive compound is added in an amount of 0.01 to 10 wt %, preferably 0.01 to 5 wt %, more preferably 0.01 to 3 wt %, and even more preferably 0.01 to 0.5 wt %, based on the total amount of the electrolyte. The inhibition effect of gas generation is not realized sufficiently when the compound is used in an amount of less than 0.01 wt %, and the cycle life characteristics at room temperature are deteriorated when the compound is used in an amount exceeding 10 wt %.

The lithium salt acts as a supply source of lithium ions in the battery, making the basic operation of a lithium battery possible. The non-aqueous organic solvent plays a role of a medium wherein ions capable of participating in the electrochemical reaction are mobilized.

The lithium salt is preferably selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ where x and y are natural numbers, LiCl, LiI and combinations thereof.

The concentration of the lithium salt preferably ranges from 0.6 to 2.0M, and more preferably 0.7 to 1.6M. When the concentration of the lithium salt is less than 0.6M, the electrolyte performance deteriorates due to its lack of ionic conductivity. When the concentration of the lithium salt is greater than 2.0M, the lithium ion mobility deteriorates due to an increase of the electrolyte viscosity.

The non-aqueous organic solvent may include a carbonate, an ester, an ether, or a ketone. Examples of carbonates include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC). Examples of esters include butyrolactone (BL), decanolide, valerolactone, mevalonolactone, caprolactone, n-methyl acetate, n-ethyl acetate, n-propyl acetate, etc. Examples of ethers include dibutyl ether, etc. Examples of ketones include polymethylvinyl ketone, etc. However, the non-aqueous organic solvent is not limited to the above solvents.

It is preferable to use a mixture of a chain carbonate and a cyclic carbonate. The cyclic carbonate and the chain carbonate are preferably mixed together in a volume ratio of 1:1 to 1:9, preferably 1:1.5 to 1:4. When the cyclic carbonate and the chain carbonate are mixed in the above volume ratio, and the mixture is used as an electrolyte, the electrolyte performance may be enhanced.

In addition, the electrolyte of the present invention may further include mixtures of the carbonate solvents and aromatic hydrocarbon solvents of Formula (2):

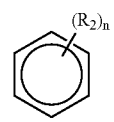

(2)

where $R_2$ is a halogen radical or a $C_1$-$C_{10}$ alkyl; and n is an integer ranging from 0 to 6, preferably 1 to 5, and more preferably 1 to 3.

Examples of aromatic hydrocarbon solvents include benzene, chlorobenzene, nitrobenzene, fluorobenzene, toluene, fluorotoluene, trifluorotoluene, and xylene. The carbonate-based solvents and the aromatic hydrocarbon solvents are preferably mixed together in a volume ratio of 1:1 to 30:1. When a carbonate-based solvent and an aromatic hydrocarbon solvent are mixed with each other in the aforementioned volume ratio, and the mixture is used as an electrolyte, the electrolyte performance may be enhanced.

The electrolyte of the present invention further includes a carbonate-based additive compound along with the additive compound for improving cycle life characteristics. The carbonate-based additive compound has electron-withdrawing groups with high electronegativity selected from the group consisting of halogens, cyano (CN) radicals, and nitro ($NO_2$) radicals. The carbonate-based additive compound is preferable a cyclic carbonate. As the cyclic carbonate, an ethylene carbonate derivative represented by formula (3) is preferable:

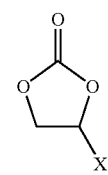

(3)

where X is selected from the group consisting of halogen radicals, cyano radicals, and nitro radicals.

The electrolyte of the present invention further includes vinylene carbonate or a derivative thereof along with the above-described additive compound for improving cycle life characteristics.

The compound used for improving cycle life characteristics is added in an amount from 0.01 to 10 wt %, preferably 0.01 to 5 wt %, based on the total amount of the electrolyte. The improvement of cycle life characteristics is not sufficient when the compound is used in an amount of less than 0.01 wt %, and the problem of swelling at high temperature occurs when the compound is used in an amount exceeding 10 wt %.

An electrolyte for a lithium secondary battery of the present invention is stable at a temperature ranging from −20 to 60° C., thereby maintaining stable characteristics of the battery even at a voltage of 4V. In the present invention, the lithium secondary battery includes all lithium secondary batteries including lithium ion batteries, lithium polymer batteries, etc.

The lithium secondary battery of the present invention uses a material that is capable of reversible intercalation/deintercalation of the lithium ions (a lithiated intercalation compound), or a sulfur-based compound, as a positive active material. Examples of materials that are capable of reversible intercalation/deintercalation of the lithium ions are lithium-containing metal oxides or lithium-containing calcogenide compounds such as $LiCoO_2$, $LiNiO_2$, $LiMnO_2$, $LiMn_2O_4$, $LiNi_{1-x-y}Co_xM_yO_2$ where $0<x<1, 0<y<1, 0<x+y<1$, and M is a metal such as Al, Sr, Mg, La, etc., $LiFeO_2$, $V_2O_5$, $TiS_2$, and $MoS_2$. The sulfur-based compounds, which form the positive active material of the lithium-sulfur battery, include elemental sulfur, $Li_2S_n$ $(n \geq 1)$, organic sulfur compounds, $Li_2S_n$ $(n \geq 1)$ dissolved in a catholyte, and a carbon-sulfur polymers of the form $(C_2S_x)_n$ where x is between 2.5 and 50 and $n \geq 2$.

The lithium secondary battery of the present invention uses a lithium metal, a lithium-containing alloy, a material that is capable of reversibly forming a lithium-containing compound, or a material that is capable of reversible intercalation/deintercalation of the lithium ions, as a negative active material.

Examples of materials that are capable of reversible intercalation/deintercalation of the lithium ions are crystalline or amorphous carbon, and carbon complexes. Examples of crystalline carbon include natural graphite or artificial graphite such as mesocarbon fiber (MCF) or mesocarbon microbeads (MCMB). Examples of non-crystalline carbon include soft carbon (low-temperature calcinated carbon) which is obtained by heat-treating pitch at 1000° C., and hard carbon (high-temperature calcinated carbon) which is obtained by carbonizing polymer resin. The compounds that can reversibly form a lithium-containing compound by a reaction with lithium ions include silicon (Si), titanium nitrate, and tin oxide ($SnO_2$).

A lithium secondary battery is fabricated by the following process. Positive and negative electrodes are fabricated by coating a slurry including active materials on a current collector of an appropriate thickness and length. An electrode assembly is prepared by winding or laminating a positive electrode, a negative electrode, and a separator interposed between the positive and negative electrodes, then placing the electrode assembly into a battery case. An electrolyte of the present invention is injected into the case, and the upper part of the battery case is sealed. The separator interposed between the positive and negative electrodes may be polyethylene, polypropylene, or polyvinylidene fluoride monolayered separator; a polyethylene/polypropylene double layered separator; a polyethylene/polypropylene/polyethylene three layered separator; or a polypropylene/polyethylene/polypropylene three layered separator.

The lithium secondary battery can be a power source for many types of electrical equipment, for example, portable telephones, cellular phones, game machines, portable televisions, notebook computers, calculators, etc., but is not limited thereto.

The following examples further illustrate the present invention in detail, but are not to be construed to limit the scope thereof.

EXAMPLES AND COMPARATIVE EXAMPLES

Examples 1 to 4

Ethylene carbonate (EC)/ethyl methyl carbonate (EMC)/fluorobenzene (FB)/propylene carbonate (PC) were mixed in a volume ratio of 30/55/10/5 in order to prepare an organic mixed solvent, and 1.15 M $LiPF_6$ were added thereto. Additive compounds respectively including 1, 2, 3, and 5 wt % of 1-methyl-2-pyrrolidone based on the total amount of the electrolyte were added to batches of the solution to prepare electrolytes of Examples 1 to 4.

$LiCoO_2$ having an average particle diameter of 10 μm as a positive active material, Super P (acetylene black) as a conductive agent, and polyvinylidenefluoride (PVdF) as a binder were mixed in a weight ratio of 94:3:3 in N-methyl-2-pyrrolidone (NMP) to prepare a positive slurry. The slurry was coated on an aluminum foil, dried, and compressed by a roll press, thus manufacturing a positive electrode having a width of 4.9 cm and a thickness of 147 μm. Artificial graphite (Smilion) as a negative active material, oxalic acid, and PVdF as a binder were mixed in a weight ratio of 89.8:0.2:10 to prepare a negative material slurry. The slurry was coated on a copper foil, dried, and compressed by a roll press, thus manufacturing a negative electrode having a width of 5.1 cm and a thickness of 178 μm. For each of the exemplary electrolytes, a polyethylene porous film separator having a width of 5.35 cm and a thickness of 18 μm was interposed between the manufactured positive and negative electrodes, followed by winding and placing into a pouch case. 2.3 g of each of the electrolytes prepared as above were respectively injected into the cases, thus completing the fabrication of the 820 mAh pouch-type lithium secondary battery cells.

Example 5

A lithium secondary battery cell was prepared in the same manner as in Example 1, except that 1.15 M $LiPF_6$ and an additive including 1 wt % of 1-methyl-2-pyrrolidone and 1 wt % of fluoroethylene carbonate (FEC) based on the total weight of electrolyte were added to a solvent of ethylene carbonate (EC)/ethyl methyl carbonate (EMC)/fluorobenzene (FB)/propylene carbonate (PC) mixed in a volume ratio of 30/55/10/5 to prepare an electrolyte.

Example 6

A lithium secondary battery cell was prepared in the same manner as in Example 1, except that 1.15 M $LiPF_6$ and an additive including 1 wt % of 1-methyl-2-pyrrolidone and 2 wt % of fluoroethylene carbonate (FEC) based on the total weight of electrolyte were added to a solvent of ethylene carbonate (EC)/ethyl methyl carbonate (EMC)/fluorobenzene (FB)/propylene carbonate (PC) mixed in a volume ratio of 30/55/10/5 to prepare an electrolyte.

Example 7

A lithium secondary battery cell was prepared in the same manner as in Example 1, except that 1.15 M $LiPF_6$ and an additive including 1 wt % of 1-methyl-2-pyrrolidone and 3 wt % of fluoroethylene carbonate (FEC) based on the total weight of electrolyte were added to a solvent of ethylene carbonate (EC)/ethyl methyl carbonate (EMC)/fluorobenzene (FB)/propylene carbonate (PC) mixed in a volume ratio of 30/55/10/5 to prepare an electrolyte.

Example 8

A lithium secondary battery cell was prepared in the same manner as in Example 1, except that 1.15 M LiPF$_6$ and an additive including 1 wt % of 1-methyl-2-pyrrolidone and 5 wt % of fluoroethylene carbonate (FEC) based on the total weight of electrolyte were added to a solvent of ethylene carbonate (EC)/ethyl methyl carbonate (EMC)/fluorobenzene (FB)/propylene carbonate (PC) mixed in a volume ratio of 30/55/10/5 to prepare an electrolyte.

Example 9

Ethylene carbonate (EC)/ethyl methyl carbonate (EMC)/fluorobenzene (FB)/propylene carbonate (PC) were mixed in a volume ratio of 30/55/10/5 in order to prepare an organic mixed solvent. 1.15 M LiPF$_6$ were added to the solvent, and an additive compound including 3 wt % of 1-methyl-2-pyrrolidone based on the total amount of the electrolyte was further added to the solution to prepare an electrolyte.

LiCoO$_2$ having an average particle diameter of 10 μm as a positive active material, Super P (acetylene black) as a conductive agent, and polyvinylidenefluoride (PVdF) as a binder were mixed in a weight ratio of 94:3:3 in N-methyl-2-pyrrolidone (NMP) to prepare a positive slurry. The slurry was coated on an aluminum foil, dried, and compressed by a roll press, thus manufacturing a positive electrode having a width of 4.9 cm and a thickness of 147 μm. Artificial graphite (Smilion) as a negative active material, oxalic acid, and PVdF as a binder were mixed in a weight ratio of 89.8:0.2:10 to prepare a negative material slurry. The slurry was coated on a copper foil, dried, and compressed by a roll press, thus manufacturing a negative electrode having a width of 5.1 cm and a thickness of 178 μm. Between the manufactured positive and negative electrodes, a polyethylene porous film separator having a width of 5.35 cm and a thickness of 18 μm was interposed followed by winding and placing into a pouch case. 2.3 g of the electrolyte prepared as above were injected into the case, thus completing the fabrication of the 640 mAh pouch-type lithium secondary battery cell.

Comparative Example 1

A lithium secondary battery cell was prepared in the same manner as in Example 1, except that 1.15 M LiPF$_6$ was added to a solvent of ethylene carbonate (EC)/ethyl methyl carbonate (EMC)/fluorobenzene (FB)/propylene carbonate (PC) mixed in a volume ratio of 30/55/10/5 to prepare an electrolyte.

Comparative Example 2

A lithium secondary battery cell was prepared in the same manner as in Example 9, except that 1.15 M LiPF$_6$ was added to a solvent of ethylene carbonate (EC)/ethyl methyl carbonate (EMC)/fluorobenzene (FB)/propylene carbonate (PC) mixed in a volume ratio of 30/55/10/5 to prepare an electrolyte.

Comparative Example 3

Ethylene carbonate (EC)/ethyl methyl carbonate (EMC)/fluorobenzene (FB)/propylene carbonate (PC) were mixed in a volume ratio of 30/55/10/5 in order to prepare an organic mixed solvent. 1.15 M LiPF$_6$ were added to the solvent, and an additive compound including 1 wt % of fluoroethylene carbonate based on the total amount of the electrolyte was further added to the solution to prepare an electrolyte.

In order to evaluate the swelling inhibition properties at high temperature, the battery cells of Examples 1, 5, and 9 and Comparative Examples 1 and 2 were placed in a high temperature chamber at 90° C., and the thickness of the cells was measured after 4 hours and 24 hours. The measurement results are shown in Table 1. The data of Table 1 are average values of ten cells.

TABLE 1

|  | Additive compound | Initial thickness | Thickness after storage at 90° C. for 4 hours (Thickness variation ratio) | Thickness after storage at 90° C. for 24 hours (Thickness variation ratio) |
| --- | --- | --- | --- | --- |
| Example 1 | 1-methyl-2-pyrrolidone (1 wt %) | 5.22 mm | 5.42 mm (3.8%) | 5.68 mm (8.6%) |
| Example 5 | 1-methyl-2-pyrrolidone (1 wt %) and FEC (1 wt %) | 5.23 mm | 5.54 mm (5.9%) | 5.72 mm (9.8%) |
| Comp. Example 1 | — | 5.22 mm | 8.48 mm (62%) | 13.03 mm (150%) |
| Example 9 | 1-methyl-2-pyrrolidone (3 wt %) | 4.11 mm | 4.15 mm (0.9%) | 4.32 mm (5%) |
| Comp. Example 2 | — | 4.11 mm | 5.55 mm (35%) | 8.76 mm (113%) |

As shown in Table 1, the thickness variation ratios of Examples 1, 5, and 9 according to the present invention were much smaller than those of Comparative Examples 1 and 2, indicating that swelling inhibition properties of the Examples at high temperature were improved.

Figure 2:
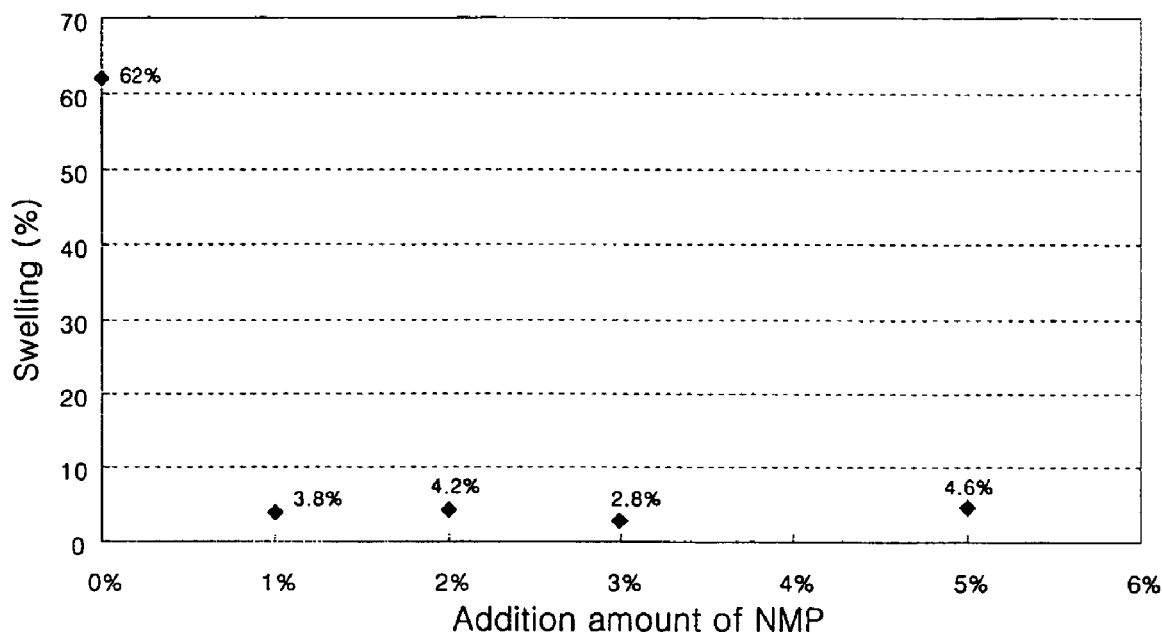
FIG. 2 is a graph illustrating thickness variation after batteries comprising electrolytes of Examples 1-4 and Comparative Example 1 were placed in a chamber at 90° C. for four days.
Figure 3:
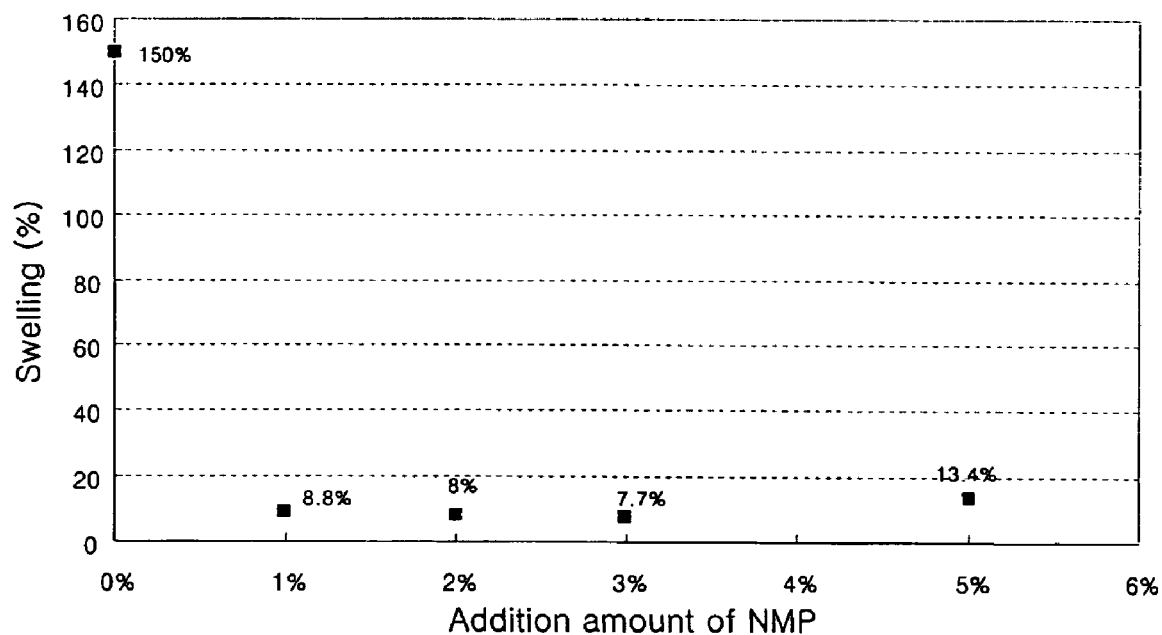
FIG. 3 is a graph illustrating thickness variation after batteries comprising electrolytes of Examples 1-4 and Comparative Example 1 were placed in a chamber at 90° C. for 24 hours.

In order to show swelling inhibition properties according to the amount of the additive compound added, FIG. 2 shows the thickness variation ratios after the batteries of Examples 1 to 4 and Comparative Example 1 were placed at 90° C. for 4 hours, and FIG. 3 shows the thickness variation ratios after the batteries of Examples 1 to 4 and Comparative Example 1 were placed at 90° C. for 24 hours. As shown in FIGS. 2 and 3, the additive compound of formula (1) shows good swelling inhibition properties in cases when it was added in amounts of 1, 2, 3 and 5 wt %.

Figure 4:
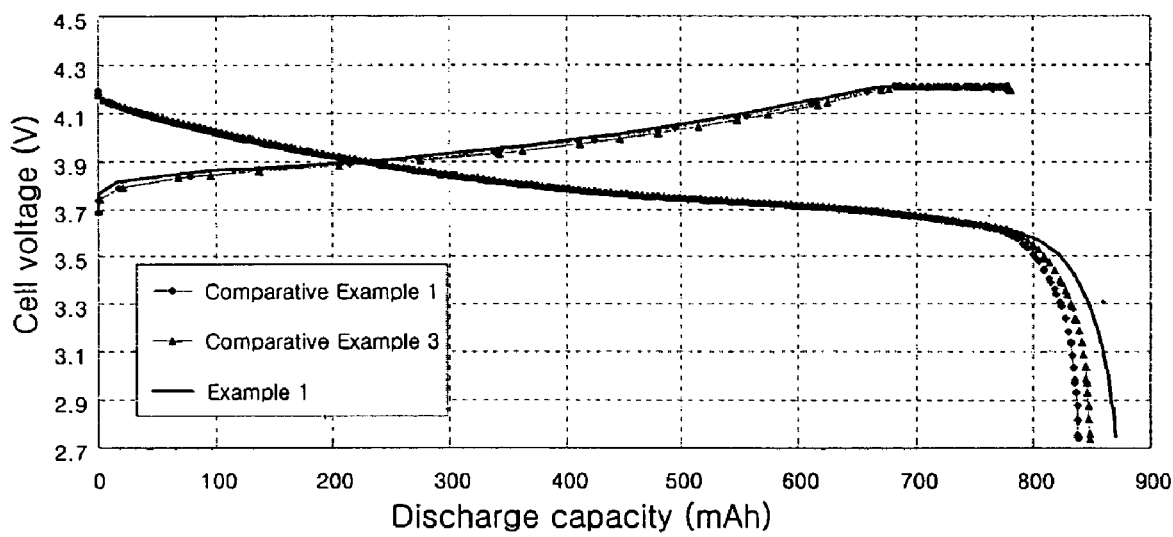
FIG. 4 is a graph illustrating charge-discharge characteristics of battery cells according to Example 1 and Comparative Example 1 at formation.

The lithium battery cells according to Examples 1 to 9 and Comparative Example 1 were charged at 0.5C to a cut-off current of 20 mA and a cut-off voltage of 4.2V under constant current and constant voltage (CC-CV) at 25° C., then discharged at 0.2 C to a cut-off voltage of 2.75V. The measurement results of charge-discharge characteristics at formation of Example 1 and Comparative Examples 1 and 3 are shown in FIG. 4. The charge-discharge characteristics of Example 1 were relatively improved over those of Comparative Examples 1 and 3.

Figure 5:
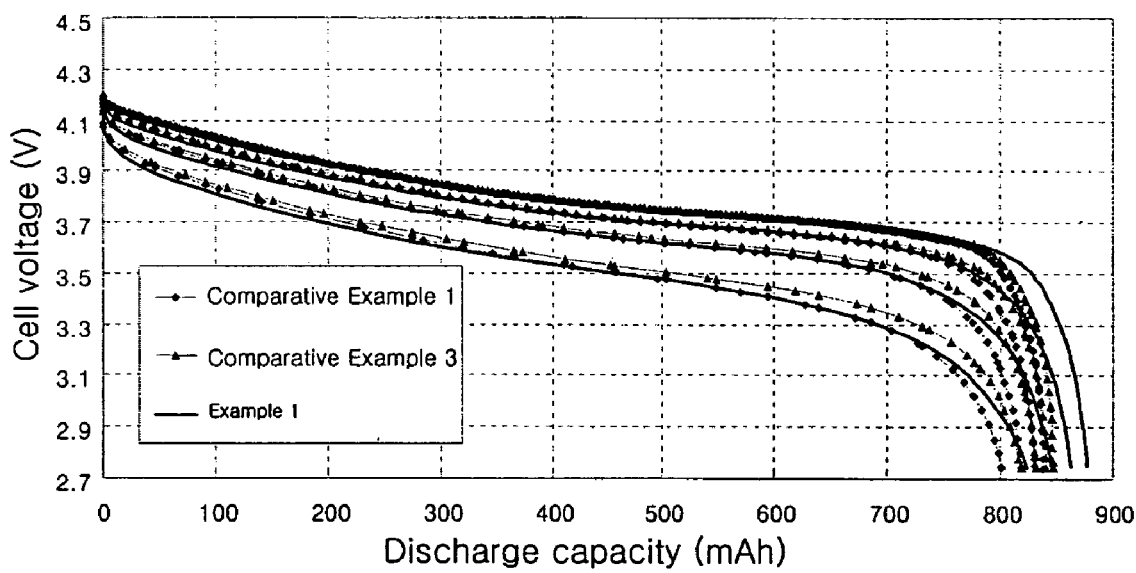
FIG. 5 is a graph illustrating discharge characteristics of the battery cells according to Example 1 of the present invention, and Comparative Example 1.

In order to evaluate discharge characteristics at various C-rates after formation, the lithium battery cells according to Examples and Comparative Examples were charged at 0.5 C to a cut-off current of 82 mA and a cut-off voltage of 4.2V under constant current and constant voltage (CC-CV), then discharged at 0.2 C (standard capacity), 1 C, and 2 C to a cut-off voltage of 2.7V. The measurement results of capacities at 0.5 C, 1 C, and 2 C of Example 1 and Comparative Examples 1 and 3 are shown in FIG. 5. The above charge-discharge was repeated with respect to five battery cells for each type, and mean values of the capacities are shown in Table 2.

TABLE 2

| | Standard capacity (mAh) | | Capacity at various C-rates (mAh) | | |
|---|---|---|---|---|---|
| | Charging | Discharging | 0.5 C | 1 C | 2 C |
| Example 1 | 883 | 876 | 863 | 846 | 823 |
| Example 2 | 874 | 870 | 855 | 840 | 812 |
| Example 3 | 883 | 877 | 860 | 842 | 812 |
| Example 4 | 881 | 873 | 856 | 836 | 812 |
| Example 5 | 878 | 873 | 863 | 847 | 823 |
| Example 6 | 876 | 871 | 858 | 846 | 820 |
| Example 7 | 873 | 869 | 855 | 843 | 816 |
| Example 8 | 876 | 871 | 858 | 852 | 828 |
| Comparative Example 1 | 851 | 841 | 834 | 822 | 806 |

As shown in Table 2, standard capacities of Examples 1 to 5 increase over Comparative Example 1 by about 30 mAh or more, and capacities at 2 C of Examples 1 to 5 increase over Comparative Example 1 by about 6 mAh or more.

Figure 6:
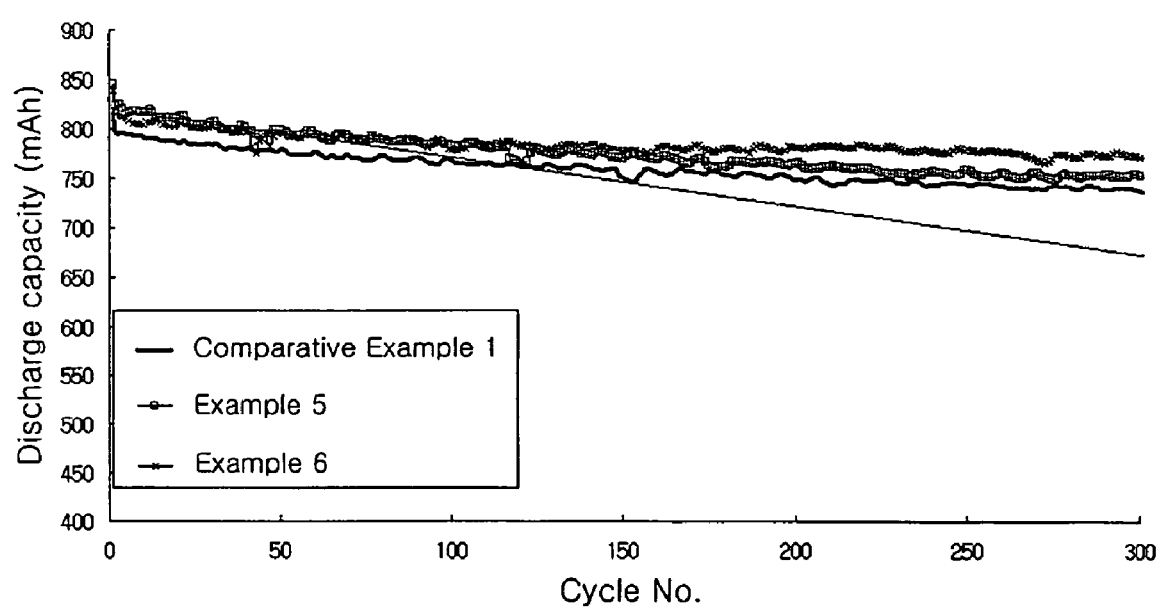
FIG. 6 is a graph illustrating cycle life characteristics of the battery cells according to Examples 1 and 5 of the present invention, and Comparative Examples 1 and 2.

The lithium battery cells according to Examples 5, 6, and Comparative Example 1 were charged at 1 C to a cut-off voltage of 4.2V under constant current and constant voltage (CC-CV), then discharged at 1 C to a cut-off voltage of 2.7V. The charge-discharge was repeated to evaluate cycle life characteristics, and the results are shown in FIG. 6. In FIG. 6, the diagonal line represents a 70% cycle life maintenance line over 300 cycles. As shown in FIG. 6, the cycle life characteristics of Examples 5 and 6 were improved over Comparative Example 1.

The additive compound added to the electrolyte of the present invention decomposes earlier than an organic solvent to form a conductive polymer layer on the surface of a positive electrode, and prevents decomposition of the organic solvent. Accordingly, the electrolyte of the present invention inhibits gas generation caused by decomposition of the organic solvent at initial charging, and thus reduces an increase of internal pressure and swelling during high temperature storage, and improves capacity and cycle life characteristics, etc.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A non-aqueous electrolyte for a lithium secondary battery, comprising:
   a lithium salt;
   an organic solvent comprising a mixed solvent of a carbonate solvent and an aromatic hydrocarbon solvent;
   a first additive compound selected from the group consisting of compounds represented by formula (1) and derivatives thereof,

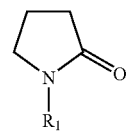

(1)

where $R_1$ is selected from the group consisting of, alkyls, ester radicals, and aliphatic carbonate radicals, and the first additive compound is present in an amount from 0.01 to 5 wt. % based on the total amount of electrolyte; and a second additive compound selected from the group consisting of compounds represented by formula (3),

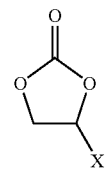

(3)

where X is selected from the group consisting of halogen radicals, cyano radicals, and nitro radicals, and the second additive compound is present in an amount from 0.01 to 5 wt % based on the total amount of electrolyte.

2. The non-aqueous electrolyte for a lithium secondary battery according to claim 1, wherein $R_1$ is selected from the group consisting of $C_1$ to $C_7$ alkyls, ester radicals represented by —COOR' where R' is an alkyl, and alkyl carbonate radicals represented by —CO(OR") where R" is an alkyl.

3. The non-aqueous electrolyte for a lithium secondary battery according to claim 1, wherein the first additive compound is selected from the group consisting of 1-methyl-2-pyrrolidone, 1-ethyl-2-pyrrolidone, and mixtures thereof.

4. The non-aqueous electrolyte for a lithium secondary battery according to claim 1, wherein the first additive compound is present in an amount from 0.01 to 3 wt % based on total weight of the electrolyte.

5. The non-aqueous electrolyte for a lithium secondary battery according to claim 4, wherein the first additive compound is present in an amount from 0.01 to 0.5 wt % based on total weight of the electrolyte.

6. The non-aqueous electrolyte for a lithium secondary battery according to claim 1, wherein the lithium salt is selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ where x and y are natural numbers, LiCl, and LiI.

7. The non-aqueous electrolyte for a lithium secondary battery according to claim 6, wherein the lithium salt is present at a concentration from 0.6 to 2.0M.

8. The non-aqueous electrolyte for a lithium secondary battery according to claim 1, wherein the carbonate solvent is selected from the group consisting of dimethyl carbonate, diethyl carbonate, dipropyl carbonate, methylpropyl carbonate, ethylpropyl carbonate, methylethyl carbonate, ethylene carbonate, propylene carbonate, and butylene carbonate.

9. The non-aqueous electrolyte for a lithium secondary battery according to claim 1, wherein the carbonate solvent is a mixed solvent of a cyclic carbonate and a chain carbonate.

10. The non-aqueous electrolyte for a lithium secondary battery according to claim 1, wherein the aromatic hydrocarbon solvent is a compound of Formula (2):

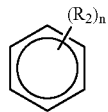
(2)

wherein $R_2$ is selected from the group consisting of halogen radicals and $C_1$-$C_{10}$ alkyls, and n is an integer ranging from 0 to 6.

11. The non-aqueous electrolyte for a lithium secondary battery according to claim 10, wherein the aromatic hydrocarbon solvent is selected from the group consisting of benzene, fluorobenzene, toluene, trifluorotoluene, xylene, and mixtures thereof.

12. The electrolyte of a lithium secondary battery according to claim 1, wherein the carbonate-based additive compound is fluoroethylene carbonate.

13. The non-aqueous electrolyte for a lithium secondary battery according to claim 1, wherein the electrolyte further comprises vinylene carbonate or a derivative thereof.

* * * * *